United States Patent
Terada et al.

(10) Patent No.: US 6,489,703 B2
(45) Date of Patent: Dec. 3, 2002

(54) COMMUTATOR FORMING PLATE, COMMUTATOR, MOTOR WITH COMMUTATOR AND MANUFACTURING THE SAME

(75) Inventors: Yuuichi Terada, Hamamatsu (JP); Nobuo Kasao, Kosai (JP); Kazunobu Kanno, Toyohashi (JP)

(73) Assignee: Asmo Co., Ltd., Shizuoka (JP)

(*) Notice: Subject to any disclaimer, the term of this patent is extended or adjusted under 35 U.S.C. 154(b) by 0 days.

(21) Appl. No.: 09/735,653

(22) Filed: Dec. 14, 2000

(65) Prior Publication Data
US 2001/0004177 A1 Jun. 21, 2001

(30) Foreign Application Priority Data

| Dec. 20, 1999 | (JP) | ............................................. 11-361029 |
| Dec. 20, 1999 | (JP) | ............................................. 11-361031 |
| Aug. 10, 2000 | (JP) | ..................................... 2000-242689 |
| Aug. 10, 2000 | (JP) | ..................................... 2000-242690 |

(51) Int. Cl.⁷ ................................................. H02K 13/00
(52) U.S. Cl. ..................... 310/233; 310/235; 310/236
(58) Field of Search ................................. 310/233, 234, 310/235, 236, 42; 29/597

(56) References Cited

U.S. PATENT DOCUMENTS

| 3,140,414 A | * | 7/1964 | Skjodt | 310/233 |
| 3,376,443 A | * | 4/1968 | McColl | 310/233 |
| 3,492,519 A | * | 1/1970 | Kirkwood et al. | 310/233 |
| 4,920,633 A | * | 5/1990 | Wojcik | 29/597 |
| 5,204,574 A | * | 4/1993 | Kanno et al. | 310/233 |
| 5,584,115 A | * | 12/1996 | Takahashi | 29/597 |

* cited by examiner

Primary Examiner—Tran Nguyen
(74) Attorney, Agent, or Firm—Law Offices of David G. Posz

(57) ABSTRACT

In a commutator forming plate to be rounded into a cylinder which is to be cut at constant angular intervals to form a plurality of commutator segments after being filled with insulating material, a plurality of lands rising at given intervals on one surface of a plate is provided and a plurality of projecting portions protruding nearly perpendicular to a rising direction of each of the lands are formed simultaneously by forming a plurality of grooves crossing with each other on the respective lands and extending so as to intersect obliquely with respective outer peripheries of the lands.

21 Claims, 9 Drawing Sheets

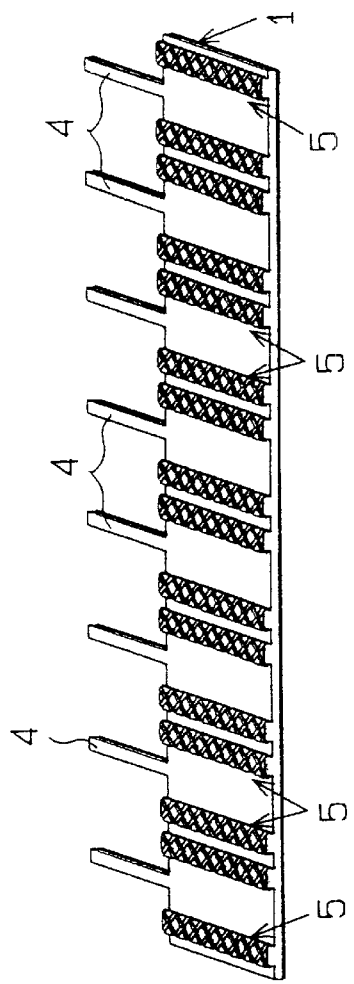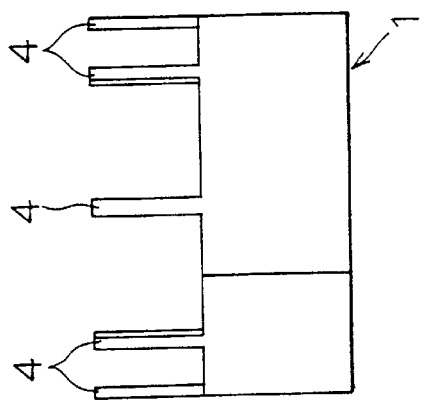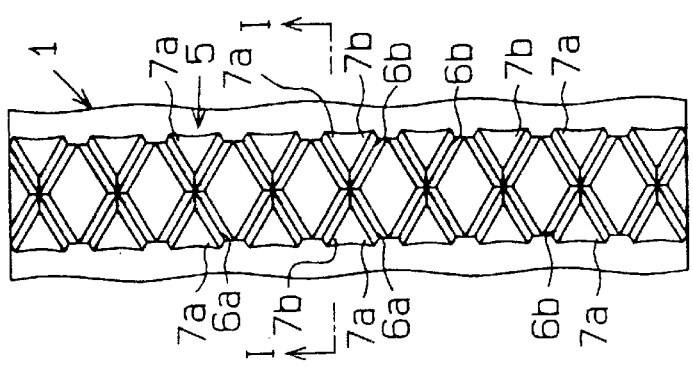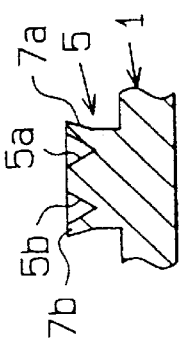

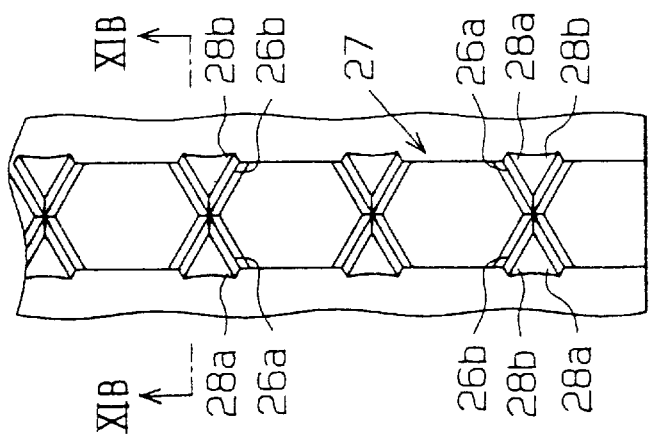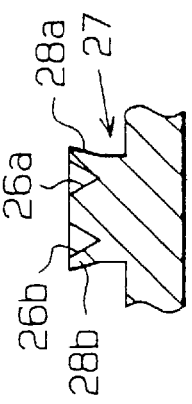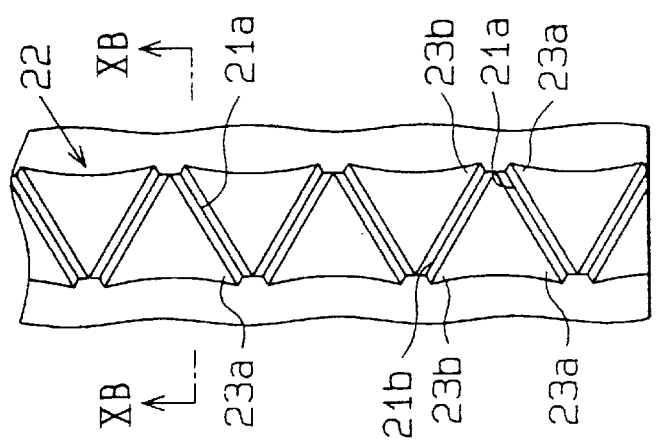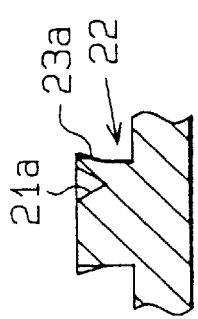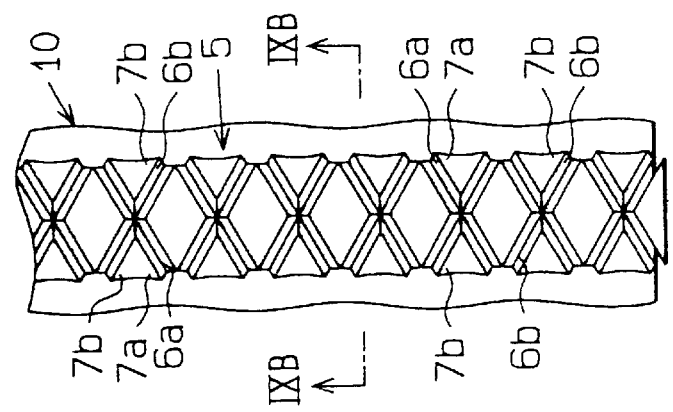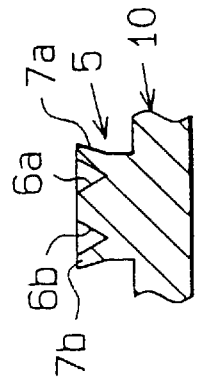

COMMUTATOR FORMING PLATE, COMMUTATOR, MOTOR WITH COMMUTATOR AND MANUFACTURING THE SAME

CROSS REFERENCE TO RELATED APPLICATION

This application is based upon and claims the benefit of priority of Japanese Patent Applications No. H.11-361029 filed on Dec. 20, 1999, No. H.11-361031 filed on Dec. 20, 1999, No. 2000-242689 filed on Aug. 10, 2000 and No. 2000-242690 filed on Aug. 10, 2000, the contents of which are incorporated herein by reference.

BACKGROUND OF THE INVENTION

1. Field of the Invention

The present invention relates to a commutator forming plate, a commumator in use of the commutator forming plate, a motor incorporating the commutator and a method of manufacturing the same.

2. Description of Related Art

Conventionally, a commutator forming plate is provided with a plurality of lands extending in parallel to each other and protruding portions formed in each of the lands nearly perpendicular to an extending direction of the land. After forming the basic plate to a cylindrical shaped member so as to locate the lands on an inner circumferential side thereof and an inside of the cylindrical shaped member is filled with a resin element, the cylindrical shaped member is cut into small pieces to constitute a plurality of commutator segments. Each of the commutator segments is firmly fixed to the resin element by holding a part of the resin element in the protruding portions.

The conventional commutator forming plate, as shown in JP-U-61-202163, is generally flat and is provided with a plurality of grooves to constitute a plurality of lands whose respective rising portions perpendicular to respective bottoms of the grooves extend linearly along the grooves. Each of the lands is provided at the rising portions thereof with projecting portions protruded respectively in opposite directions (toward the respective adjacent grooves) and on an upper surface thereof with a letter V shaped groove extending in a longitudinal direction thereof. The projecting portions are formed in such a manner that the upper surface is pressed down so as to push out respective peripheries along the grooves outwardly (toward the respective adjacent grooves) when the letter V shaped groove is formed.

The commutator forming plate is rounded to constitute a cylinder in which the lands are located inside. Then, liquid resin is poured into the cylinder and, after resign has hardened, the cylinder is cut axially into a plurality of pieces at constant angular intervals to constitute a plurality of commutator segments which are insulated with each other via hardened resin (insulator). As the respective lands having the projecting portions are rigidly engaged with the insulator so that the respective commutator segments are prevented from coming off the insulator.

In another conventional commutator forming plate, as shown in FIG. 14, projecting portions 53 protruding toward the respective grooves 52 are formed by pressing down and crushing outer peripheries of the lands 51 at intervals in a longitudinal direction thereof. As the projecting portions 53 are located inside a cylinder formed by rounding the commutator forming plate and are engaged with resin poured into and hardened in the cylinder, each of commutator segments 54 formed by dividing the cylinder is prevented from coming out the insulator.

However, in the conventional commutator forming plate disclosed in JP-U-61-202163, there is a drawback that, if the letter V shaped groove extending in a longitudinal direction of the land is formed so as to locate at a position a little bit away from the outer periphery of the land, the outer periphery is unlikely to be sufficiently pushed outwardly and, accordingly, the projecting portion sufficiently protruding cannot be formed. To cope with this problem, a highly accurate positioning is required when the letter V shaped grooves are formed.

Further, in the conventional commutator forming plate shown in FIG. 14, complicated metal dies are required to form a necessary number of the projecting portions 53 at the same time. Furthermore, as the projecting portions 53 are formed by crushing predetermined portions of outer peripheries of the lands, each position of the projecting portions 53 in an arising direction of the land 51 is considerably low relative to the upper surface of the land 51 (near the bottom of the groove). When the projecting portion 53 is located at a lower position, the insulator put between the projecting portion 53 and the bottom of the groove 52 is likely to be broken so that the commutator segment may easily come out from the insulator. Therefore, to put the projecting portion 53 at a higher position, a higher thickness of the land 51 becomes necessary, thus, resulting in increasing material cost.

SUMMARY OF THE INVENTION

An object of the present invention is to provide a commutator forming plate to be rounded into a cylinder which is to be cut at constant angular intervals to form a plurality of commutator segments after being filled with insulating material, in which projecting portions protruding nearly perpendicular to a rising direction of the land are located near an outer periphery of an upper surface of the land so that the insulator may firmly hold each of the commutator segments.

Another object of the present invention is to provide a method of manufacturing the above commutator forming plate in which the projecting portions are easily and reliably formed.

It is a further object to provide a commutator made of the commutator forming plate mentioned above and a method of manufacturing the same.

Furthermore, to provide a motor incorporating the commutator mentioned above is one of the present inventions.

To achieve the above objects, the commutator forming plate have a plurality of lands rising at given intervals in a thickness direction thereof to constitute flat upper surfaces on tops thereof. Each of the upper surfaces has at least one of outer periphery lines. Each of the lands is provided with a plurality of grooves which intersect obliquely with the outer periphery line of the upper surface so as to constitute an acute angle edge and an obtuse angle edge on the upper surface. Each of the lands is further provided with a plurality of projecting portions protruding nearly perpendicularly to a rising direction of the land from the land in a vicinity of the acute angle edge.

As each of the grooves intersects obliquely with the outer periphery line of the upper surface, an acute angle edge and an obtuse angle edge are provided in each intersecting portion of the upper surface. When the upper surface is pressed down to form the grooves, for example, by press forming or roller forming, the land is easily deformed outwardly at the same time, even if the pressing force is relatively small, at portions in a vicinity of the acute angle edges, whose each volume is smaller than that of the obtuse angle edges, so that the projecting portions may be formed. Further, it is not always necessary for forming the above projecting portions to accurately position the groove relative to the outer periphery line of the upper surface if the groove intersects obliquely with the outer periphery line of the upper surface.

It is preferable that the groove has a letter V shaped cross section. A portion of the land adjacent to the groove and nearer to the upper surface, which is more largely deformed, has a larger projecting portion.

Further, preferably, each of the grooves extends from one point of the outer periphery line of the upper surface to another point of the outer periphery line thereof so as to divide the upper surface. With this construction, two projecting portions are formed on the outer periphery line of the land at the same time by pressing down the upper surface to form the groove.

Furthermore, it is preferred that the grooves are arranged to extend to cross with each other on the upper surface. In this case, the projecting portions may be continuously formed along the outer periphery line constituting one side of a triangle formed by the grooves crossing with each other and intersecting with the outer periphery line.

Moreover, the lands are arranged on the plate to locate at positions nearer to a cutting line along which the plate is to be cut to form the commutator segments so that an interval of any two of the lands on opposite sides of each of the cutting lines is smaller than an interval of any two of the lands 5 to be located in each of the commutator segments. Therefore, each of the commutator segments may be more firmly engaged with the insulator by projecting portions positioned nearer the respective cutting lines.

Further, it is preferable that the interval of any two of the lands between which the cutting line is to be put becomes wider toward each of the upper surfaces in a rising direction of the lands. With this construction, the projecting portions in any adjacent two of the commutator segments are unlikely to come in contact with each other.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

FIG. 1A is a part view of a commutator forming plate provided with a land, grooves and projecting portions according to a first embodiment of the present invention;

FIG. 1B is a cross sectional view taken along a line 1B—1B of FIG. 1A;

FIG. 2A is a perspective view of the commutator forming plate according to the first embodiment of the present invention;

FIG. 2B is a view of a cylinder made of the commutator forming plate of FIG. 2A;

FIG. 9A is a part view showing grooves and projecting portions formed by the metal dies of FIGS. 6 and 8;

FIG. 9B is a cross sectional view taken along a line IXB—IXB of FIG. 9A;

FIG. 10A is a view of a commutator forming plate according to a second embodiment of the present invention;

FIG. 10B is a cross sectional view taken along a line XB—XB of FIG. 1A;

FIG. 11A is a view of a commutator forming plate according to a third embodiment of the present invention;

FIG. 11B is a cross sectional view taken along a line XIB—XIB of FIG. 11A;

DETAILED DESCRIPTION OF THE PREFERRED EMBODIMENTS

A commutator forming plate, a commutator and a motor according to a first embodiment of the present invention is described with reference to FIGS. 1 to 9.

Figure 3A:
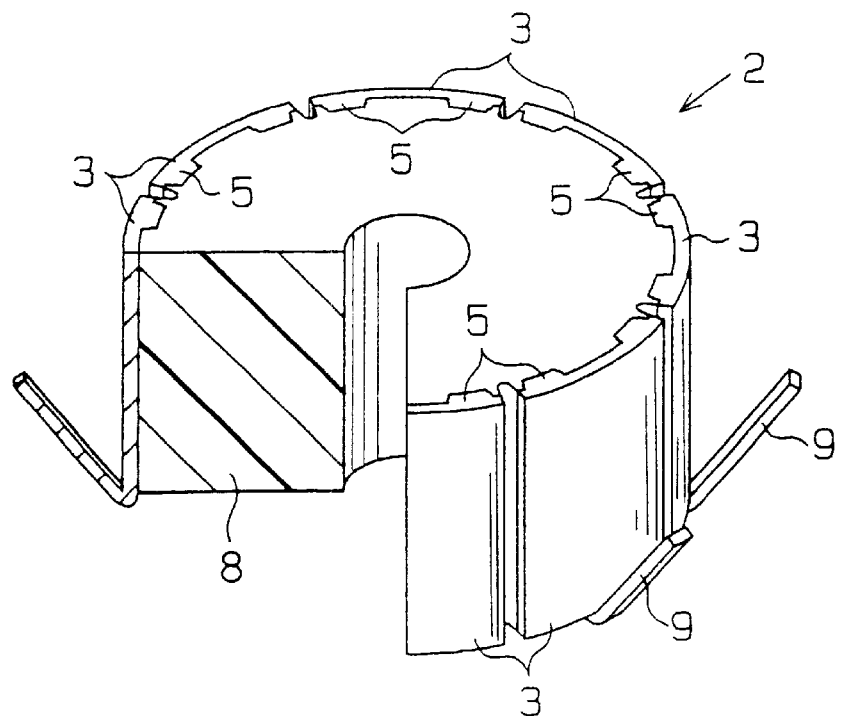
FIG. 3A is a partly broken-out perspective view of a commutator according to an embodiment of the present invention.
Figure 3B:
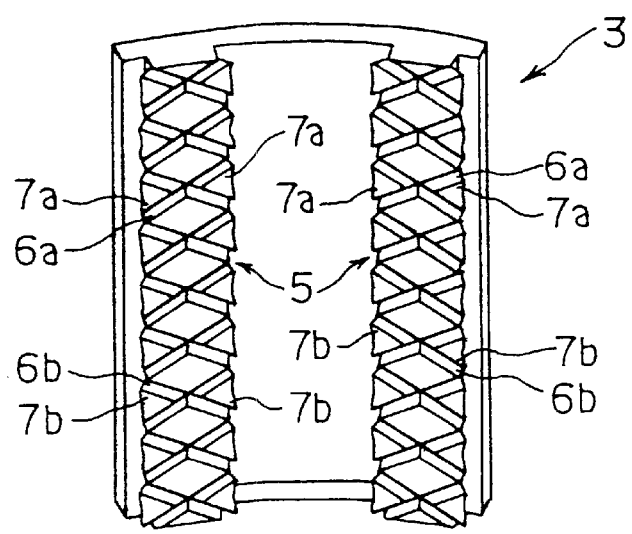
FIG. 3B is a perspective view of a commutator segment of the commutator of FIG. 3A.

As shown in FIG. 2A, a commutator forming plate 1 is made of electrically conductive material and is formed in a flat rectanglar shape. A longitudinal length of the commutator forming plate 1 corresponds to an outer circumferential length of a commutator 2 and a lateral length of the commutator forming plate 1 corresponds to an axial length of the commutator 2 (refer to FIG. 3A). The commutator forming plate 1 is rounded to form a cylinder as shown in FIG. 2B. The cylinder is cut and divided into 8 pieces to constitute 8 commutator segments 3 (refer to FIG. 3A). Each of the commutator segments is shown in FIG. 3B. The commutator forming plate 1 is provided with 8 projections 4 for risers extending outwardly from an end in a lateral direction thereof at constant angular intervals.

The commutator forming plate 1 is further provided with 16 pieces of lands 5 rising in a thickness direction thereof. The lands 5 are formed in parallel to each other in a longitudinal direction of the commutator forming plate 1 and extend from one end to the other end in a lateral direction thereof. Every two of lands 5 are located in a vicinity of and on opposite sides of a portion where the commutator forming plate 1 is to be cut (refer to FIGS. 3A and 3B).

As shown in FIGS. 1A and 1B, an upper surface of each of the lands 5 is provided with grooves 6a and 6b which extend to intersect obliquely (not perpendicularly) with both outer periphery lines thereof extending in the lateral direction, respectively. The both outer periphery lines of the upper surface mean two longer sides of a square (rectangular) to which the upper surface is shaped before the grooves 6a and 6b are provided.

The grooves 6a and 6b have cross sections formed in a letter V shape and are constituted by a plurality of grooves extending straight from one of the outer periphery lines to the other of the outer periphery lines so as to cover all over the upper surface.

The grooves 6a and 6b are formed to cross with each other nearly at a center of the upper surface in a lateral direction of the land 5. In more details, the grooves 6a and 6b are composed of a plurality of grooves extending in parallel to each other on the upper surface so as to incline upwardly at an angle of 60° from one of outer periphery lines of the upper surface (left side in FIG. 1A) to the other of outer periphery lines thereof (right side in FIG. 1A) and a plurality of grooves extending in parallel to each other on the upper surface so as to incline downwardly at an angle of 60° from one of outer periphery lines of the upper surface to the other of outer periphery lines thereof. The grooves 6a and 6b are provided in a continuous cross shape on the upper surface of the land 5 in a longitudinal direction thereof so as to constitute meshes of a net.

Each of the lands 5 is provided with projecting portions 7a and 7b protruding perpendicularly to a thickness direction of the land 5. The projecting portions 7a and 7b are formed at the same time when the grooves 6a and 6b are formed.

In more details, when the groove 6a or 6b is formed, an acute angle edge (60° edge) and an obtuse angle edge (120° edge) are formed at respective outer periphery lines of the upper surface. The acute angle edge portion, whose volume is smaller, is easily deformed so as to protrude outwardly in a lateral direction of the land 5 so that the projecting portion 7a or 7b may be formed. As the groove 6a or 6b extends straight from one of the outer periphery lines to the other of the outer periphery lines, two acute angle edges are formed on both of the outer periphery lines so that two of the projecting portions 7a or 7b are formed on opposite outer periphery lines of the upper surface, respectively. Further, as the grooves 6a and 6b are crossed with each other as mentioned above, the acute angle edges are formed at opposite corners of a side of a triangle constituted by the groove 6a or 6b and the outer periphery line so that the projecting portions 7a and 7b are formed at opposite ends of the outer periphery line constituting one side of the triangle. As a result, the projecting portions 7a and 7b are continuously connected with each other.

Then, the commutator forming plate 1 mentioned above is rounded so that a cylinder is formed so as to locate the projecting portions 7a and 7b on an inner circumferential side thereof (refer to FIG. 2B). Liquid resin is poured into an inside of the cylinder. After liquid resin has hardened, the cylinder is divided into 8 pieces. As a result, as shown in FIG. 3A, the commutator 2 having a nearly cylindrical insulator 8 made of resin and 8 pieces of the commutator segments 3 placed around outer circumference surface of the insulator 8 at constant angular intervals are formed. Each of the commutator segments 3, as shown in FIG. 3B, is formed in a shape constituting a part of the cylinder cut at given angular intervals and is provided with a plurality (two) of the lands 5 embedded into the insulator 8. As the projecting portions 7a and 7b are radially engaged with resin, each of the commutator segments 3 is prevented from coming off the insulator 8. The projections 4 for risers are outwardly bent, respectively, so that risers 9 are formed as shown in FIG. 3A.

Figure 4:
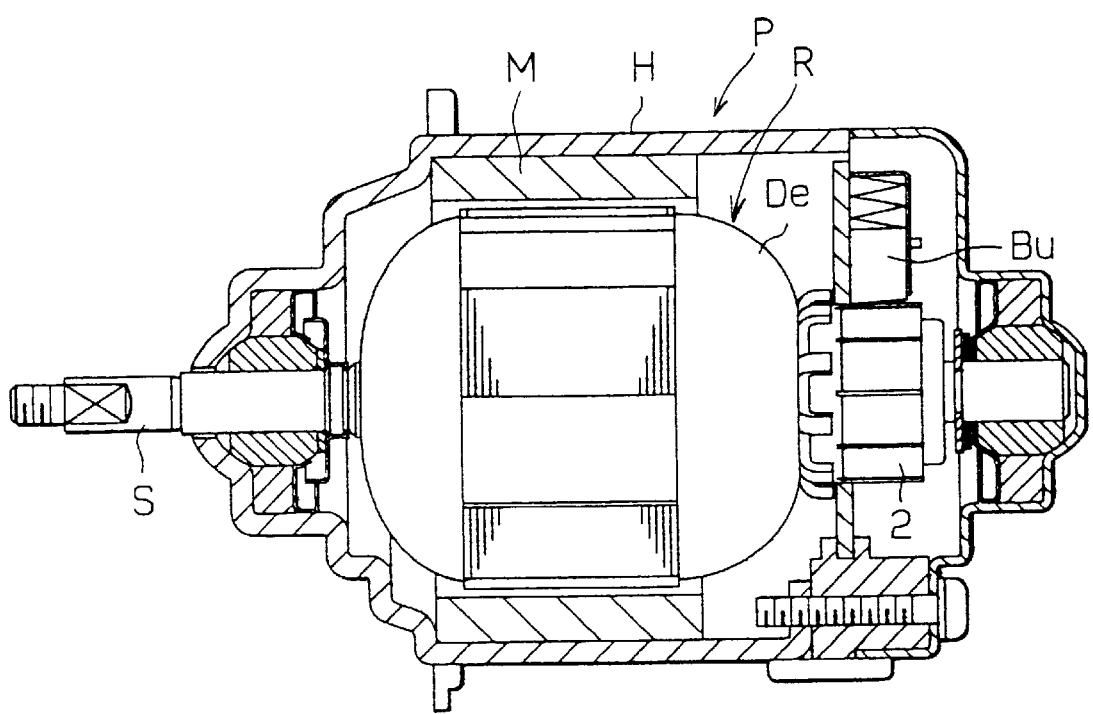
FIG. 4 is a cross sectional schematic view of a motor according to an embodiment of the present invention.

The commutator 2 is assembled to a motor as shown in FIG. 4. The motor is provided with a stator p and a rotor R. The stator P is composed of a motor housing H, magnets M and brushes Bu for current supply. The rotor R is composed of a shaft S rotatably held by the housing H, and an armature De and the commutaor, both of which are fixed to the shaft S. The brushes Bu are slidably in contact with and push against an outer circumferential surface of the commutator 2.

Next, a method of manufacturing the commutator forming plate 1 having construction mentioned above is described with reference to FIGS. 5 to 9.

Figure 5:
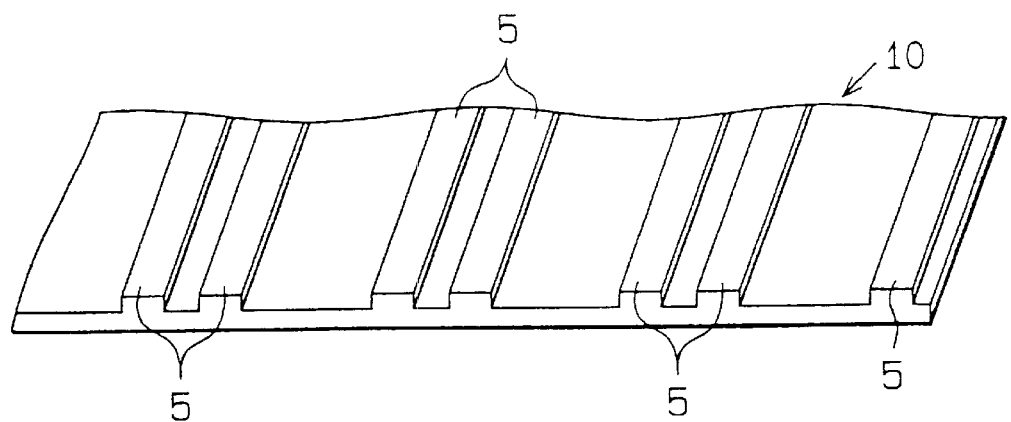
FIG. 5 is a schematic view of a plate for manufacturing the commutator forming plate of FIG. 2A.

As shown in FIG. 5, a plurality of lands 5 are formed in a plate 10 made of electrically conductive material. A longitudinal length of the plate 10 is far longer than the outer circumferential length of the commutator 2. Positions of the lands 5 on the plate 10 correspond to the positions as mentioned in the commutator forming plate 1. The lands 5 shown in FIG. 5 illustrate a state before the grooves 6a and 6b are formed.

Figure 6:
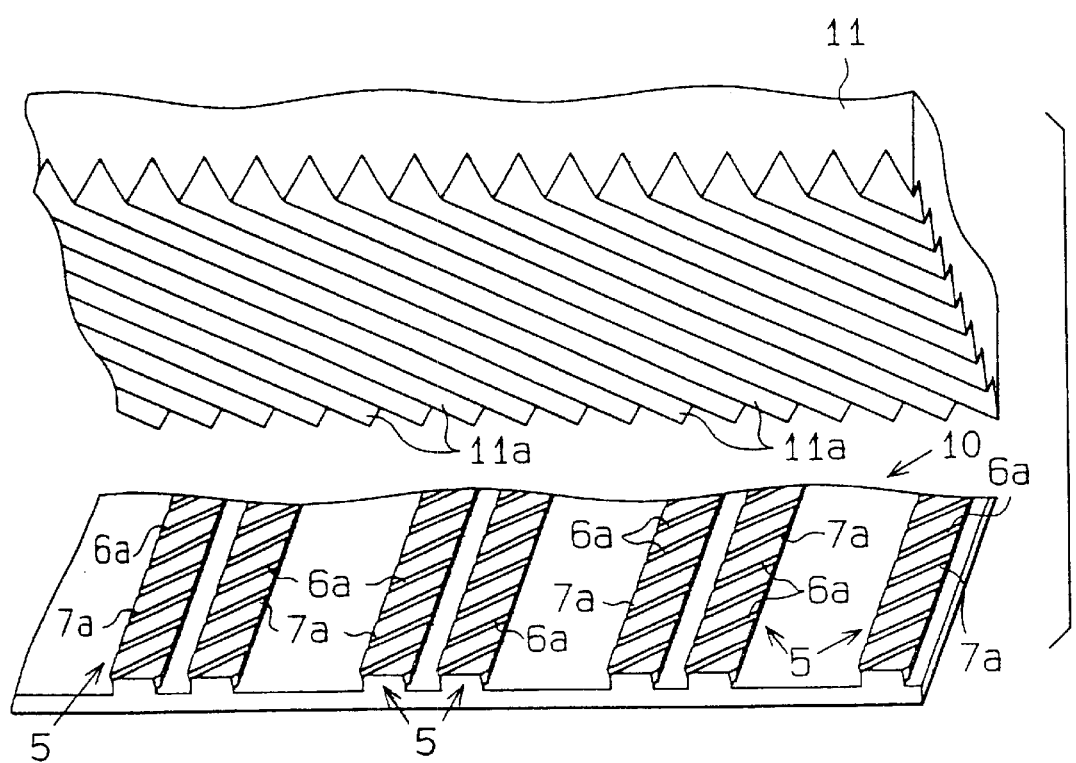
FIG. 6 is a schematic view of a metal die forming grooves on the lands of the plate of FIG. 5.
Figure 7A:
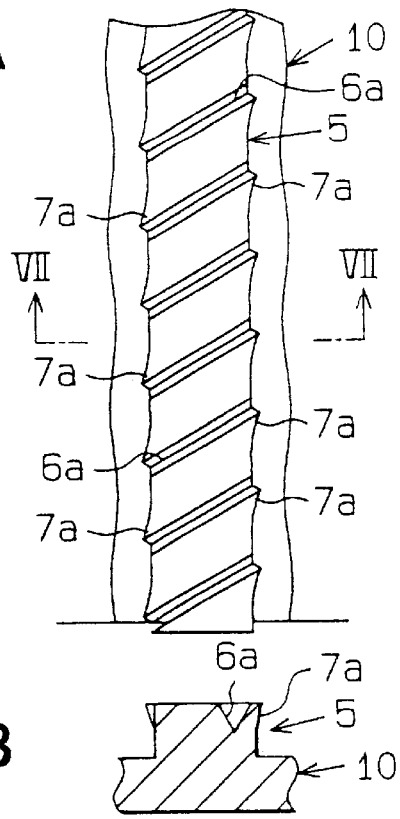
FIG. 7A is a part view showing grooves and projecting portions formed by the metal die of FIG. 6.
Figure 7B:
FIG. 7B is a cross sectional view taken along a line VIIB—VIIB of FIG. 7A.

As shown in FIG. 6, the groove 6a and the projecting portions 7a are formed by pressing in use of a metal die 11. The metal die 11 is provided with a plurality of hill portions 11a whose each cross section is shaped a letter V and which extend in parallel to each other at constant intervals. Each extending direction of the hill portions 11a is set to form the groove 6a intersecting obliquely with the outer periphery line of the upper surface of the land 5. The metal die 11 is moved to press down the upper surface of the lands 5. Accordingly, as shown in FIGS. 7A and 7B, the grooves 6a are formed and, simultaneously, the projecting portions 7a are formed since the acute angle edges formed by the grooves 6a are deformed to protrude outwardly.

Figure 8:
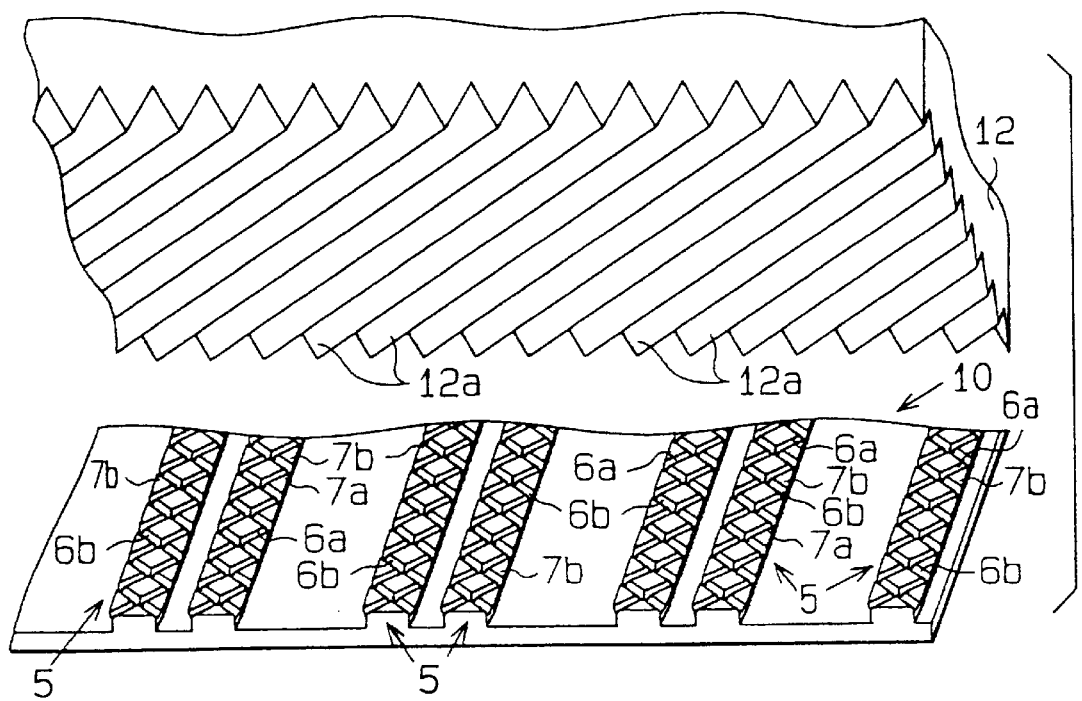
FIG. 8 is a schematic view of another metal die forming grooves on the lands shown in FIG. 7A.

As shown in FIGS. 8, 9A and 9B, the groove 6b and the projecting portions 7b are formed by pressing in use of a metal die 12. The metal die 12 is provided with a plurality of hill portions 12a whose each cross section is shaped a letter V and which extend in parallel to each other at constant intervals. Each extending direction of the hill portions 12a is opposite to that of the hill portions 11a and is set to form the groove 6b intersecting obliquely with the outer periphery line of the upper surface of the land 5. The metal die 12 is moved to press down the upper surface of the lands 5. Accordingly, as shown in FIGS. 9A and 9B, the grooves 6b are formed and, simultaneously, the projecting portions 7b are formed since the acute angle edges formed by the grooves 6b are deformed to protrude outwardly. The grooves 6a and 6b cross with each other as mentioned in the commutator forming plate 1. The projecting portions 7a and 7b are connected with each other and are continuous projecting portions on the outer periphery line of the upper surface which constitutes the one side of the triangle formed by the grooves 6a and 6b.

Next, the plate 10 is cut into pieces each having a predetermined length in a longitudinal direction thereof that corresponds to the outer circumferential length of the commutator 2. At the same time, the plate 10 is cut in such a manner that each of the cut pieces has a width of a predetermined length in a lateral direction thereof (in a longitudinal direction of the lands 5), which corresponds to an axial length of the commutator 2, and, further, has 8 pieces of the projections 4 for risers extending from one end of the width. This cutting process for forming the commutator forming plate 1 from the plate 10 is executed by stamping.

Then, as shown in FIG. 2B, each piece of the plate 10 is rounded to form a cylinder so as to locate the lands 5 on an inner circumferential side of the cylinder. Next, the cylinder is set to a tooling die (not shown) and liquid resin as insulating material is poured into an inside of the cylinder. After the resin hardened, risers 9 for the commutator 2 are formed by bending the projections 4 for risers outwardly in radial direction.

Then, as shown in FIG. 3A, the cylinder filled with the insulator 8 is divided into 8 pieces at constant angular intervals by machining to an extent that the cylinder is cut into a part of the insulator 8 on an outer circumference side of the cylinder from an axial end to the other axial end of the cylinder. Accordingly, manufacturing of the commutator 2 having the commutator segments 3 and the insulator 8 is completed.

The first embodiment mentioned above have many distinctive effects or features described below.

Figure 14:
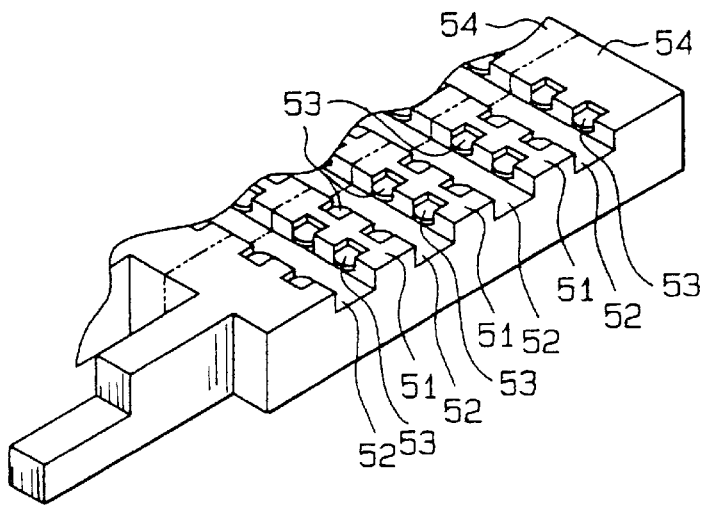
FIG. 14 is a view of a conventional commutaor forming plate as a prior art.

(1) As the acute angle edges of the upper surfaces are easily deformed, the projecting portions 7a and 7b may be easily formed by a relatively small pressing force without using a complicated metal die as shown in the prior art when the conventional projecting portions 53 are formed (FIG. 14).

(2) It is not always necessary to accurately position the grooves 6a and 6b relative to the outer periphery lines of the upper surface if the grooves 6a and 6b intersect obliquely with the outer periphery lines of the upper surface though an accurate positioning for the grooves is required in a prior art as disclosed by JP-U-61-202163.

(3) As the projecting portions 7a and 7b are formed to protrude at positions near the upper surface of the lands 5, the projecting portions 7a and 7b serve to engage rigidly with the insulator 8 so that each of the commutator segments 3 is unlikely to come off the insulator 8 without forming the lands having higher thickness as shown in FIG. 14. As a result, material cost may be saved.

(4) As each of the grooves 6a and 6b has a letter V shaped cross section, a portion of the land nearer to the upper surface, which is more largely deformed, has larger projecting portions 7a and 7b.

(5) As each of the grooves 6a and 6b extends from one of the two outer periphery lines of the upper surface to the other of the two outer periphery lines thereof so as to divide the upper surface, two of the projecting portions 7a or 7b are formed on opposite periphery sides of the land 5 concurrently by pressing down the upper surface to form the groove 6a or 6b.

(6) As the lands 5 are located away from a cutting line along which the commutator segments 3 are separated from each other, a thickness of the commutator forming plate 1 on the cutting line is relatively thin. Therefore, a machining process for cutting the commutator forming plate 1 into the respective commutator segments 3 becomes simpler and may be executed in a shorter time.

(7) As the lands 5 are arranged on the commutator forming plate 1 plate to locate at positions nearer to respective cutting lines along which the commutator forming plate 1 is to be cut to form the commutator segments 3 so that an interval of any two of the lands 5 on opposite sides of each of the cutting lines is smaller than an interval of any two of the lands 5 to be located in each of the commutator segments 3, each of the commutator segments 3 may be more firmly engaged with the insulator 8 by projecting portions 7a and 7b positioned near the respective cutting lines at opposite circumferential ends thereof.

Further, as a volume of the insulator 8 to be held by the two lands 5 in each of the commutator segments 3 becomes larger, that is, as a circumferential length of the insulator 8 to be held by the lands 5 is wider, the portion of the insulator 8 held by the lands 5 is unlikely to separate from a whole of the insulator 8 together with each of the commutator segments 3. Accordingly, each of the commutator segments 3 is further prevented from coming off the insulator 8.

(8) As the grooves 6a and 6b are formed easily by pressing in a shorter time, the productivity is better.

(9) As the metal dies 11 and 12 having a plurality of the hill portions 11a and 12a inclined in different directions are provided independently, manufacturing of the metal dies 11 and 12 are easy.

(10) As the grooves 6a and 6b extending in differently inclining directions are formed separately in their respective inclining directions by the metal dies 11 and 12, spaces into which the lands 5 protrude to form the projecting portions 7a simultaneously when the grooves 6a are formed do not interfere with spaces into which the lands 5 protrude to form the projecting portions 7b simultaneously when the grooves 6b are formed. Therefore, the independent works for forming the respective grooves 6a and 6b can be conducted with a smaller pressing force.

The first embodiment mentioned above may be modified as described below.

The upper surface of the land 5 is not limited to the square or rectangular shape but may be any shape having an outer periphery line or the patterns of the grooves 6a and 6b on the upper surface are not limited to the patterns mentioned above but may be any patterns, if the grooves 6a and 6b intersect obliquely with the outer periphery line of the upper surface to form the projecting portions 7a and 7b each of which protrudes from the land 5 nearly perpendicularly to a rising direction of the land 5. The number of the lands 5 or the number of the grooves 6a and 6b may be any numbers.

As shown in FIGS. 10A and 10B, the grooves 6a and 6b may be modified to grooves 21a and 21b as a second embodiment. The grooves 21a and 21b are composed of a plurality of grooves 21a extending in parallel to each other on the upper surface so as to incline upwardly at an angle of 60° from one of outer periphery lines of the upper surface (left side in FIG. 10A) to the other of outer periphery lines thereof (right side in FIG. 10A) and a plurality of grooves 21b extending in parallel to each other on the upper surface so as to incline downwardly at an angle of 60° from one of outer periphery lines of the upper surface to the other of outer periphery lines thereof. The respective grooves 21a and 21b are provided alternately and continuously on the upper surface of each of lands 22 in a longitudinal direction thereof so as to constitute a zigzag pattern.

Since the acute angle edge portions formed by the grooves 21a and 21b, whose each volume is smaller, is easily deformed so as to protrude outwardly in a lateral direction of the land 22, projecting portions 23a and 23b may be formed. The second embodiment has the similar effects to the first embodiment mentioned above.

As shown in FIGS. 11A and 11B, the grooves 6a and 6b may be modified to grooves 26a and 26b as a third embodiment. The grooves 26a and 26b are composed of a plurality of grooves 26a extending in parallel to each other on the upper surface so as to incline upwardly at an angle of 60° from one of outer periphery lines of the upper surface (left side in FIG. 11A) to the other of outer periphery lines thereof (right side in FIG. 11A) and a plurality of grooves 26b extending in parallel to each other on the upper surface so as to incline downwardly at an angle of 60° from one of outer periphery lines of the upper surface to the other of outer periphery lines thereof. The respective grooves 21a and 22b are provided to cross with each other at a center in a lateral direction of each of lands 27 on the upper surface of the land 27 and to locate at intervals in a longitudinal direction thereof so as to constitute a pattern having a plurality of independent cross shapes.

Since the acute angle edge portions formed by the grooves 26a and 26b, whose each volume is smaller, is easily deformed so as to protrude outwardly in a lateral direction of the land 27, projecting portions 28a and 28b may be formed. The third embodiment has the similar effects to the first embodiment mentioned above.

Figure 12A:
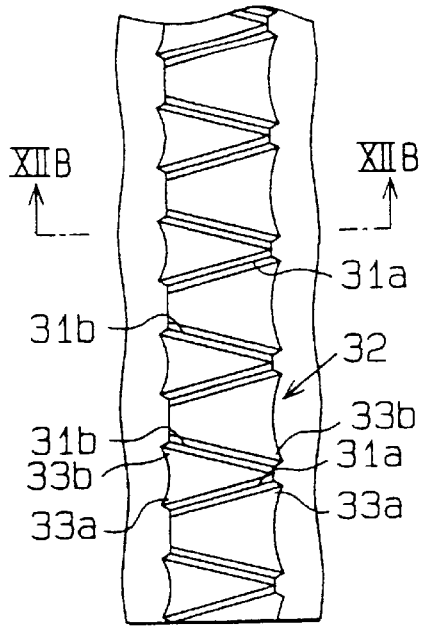
FIG. 12A is a view of a commutator forming plate according to a fourth embodiment of the present invention.
Figure 12B:
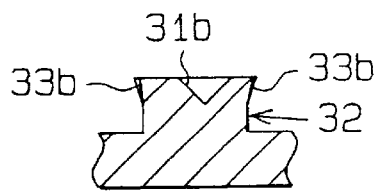
FIG. 12B is a cross sectional view taken along a line XIIB—XIIB of FIG. 12A.

As shown in FIGS. 12A and 12B, the grooves 6a and 6b may be modified to grooves 31a and 31b as a fourth embodiment. The grooves 31a and 31b are composed of a plurality of grooves 31a extending in parallel to each other on the upper surface so as to incline upwardly at an angle of 75° from one of outer periphery lines of the upper surface (left side in FIG. 12A) to the other of outer periphery lines thereof (right side in FIG. 12A) and a plurality of grooves 31b extending in parallel to each other on the upper surface so as to incline downwardly at an angle of 75° from one of outer periphery lines of the upper surface to the other of outer periphery lines thereof. The respective grooves 31a and 31b are provided to locate alternately on the upper surface of each of lands 32 in a longitudinal direction thereof and to locate at intervals on the one of outer periphery lines and continuously on the other of the outer periphery lines both in a longitudinal direction of the land 32.

Since the acute angle edge portions formed by the grooves 31a and 31b, whose each volume is smaller, is easily deformed so as to protrude outwardly in a lateral direction of the land 32, projecting portions 33a and 33b may be formed. The fourth embodiment has the similar effects to the first embodiment mentioned above.

Figure 13A:
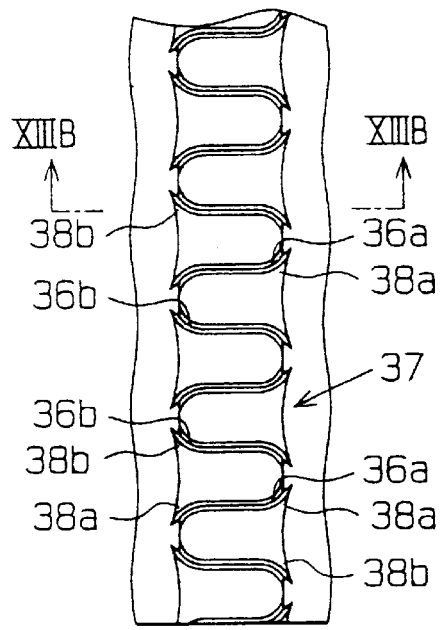
FIG. 13A is a view of a commutator forming plate according to a fifth embodiment of the present invention.
Figure 13B:
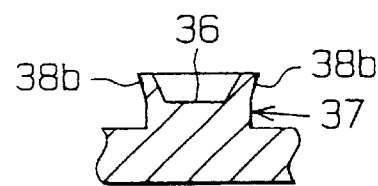
FIG. 13B is a cross sectional view taken along a line XIIIB—XIIIB of FIG. 13A.

As shown in FIGS. 13A and 13B, the grooves 6a and 6b may be modified to grooves 36a and 36b as a fifth embodiment. The grooves 36a and 36b are composed of a plurality of curved grooves 36a and 36b on the upper surface of each of the lands 37 so as to intersect obliquely with the opposite outer periphery lines facing to each other.

Since the acute angle edge portions formed by the curved grooves 36a and 36b, whose each volume is smaller, is easily deformed so as to protrude outwardly in a lateral direction of the land 37, projecting portions 38a and 38b may be formed. This embodiment has the same effects as the embodiments mentioned above. The projecting portions 38a and 38b formed by the curved grooves 36a and 36b have distinctive features that cannot be achieved by straight-line grooves.

Further, the grooves 6a and 6b may be modified to a simple pattern of the grooves 6a shown in FIGS. 7A and 7B. That is, only the projecting portions 7a are formed by the grooves 6a without providing the grooves 6b. The fifth embodiment also has the similar effects (1) to (8) as mentioned above.

Furthermore, instead of the letter V shaped groove whose width is narrower toward the bottom thereof, an any other shaped groove, for example, square or rectanglar shaped groove whose width is substantially constant from the top to the bottom thereof, may be applicable, if the groove serves to form the projecting portions mentioned above. This embodiment has the similar effects (1) to (3) and (5) to (10) as mentioned above.

Moreover, instead of the grooves 6a and 6b intersecting obliquely with both of the outer periphery lines of the land 5 which face to each other, the grooves intersecting obliquely with at least one of the outer periphery lines, that is, the grooves extending from one periphery to a middle of the land in a lateral direction thereof, is applicable to form the projecting portions in a vicinity of the acute angle edges provided on a side of the one of the outer periphery lines.

Further, instead of the lands 5 formed in parallel to each other in a longitudinal direction of the commutator forming plate 1 and extending from one end to the other end in a lateral direction thereof, the lands 5 may modify so as to be formed at given intervals in a lateral direction of the commutator forming plate 1 and to extend in a longitudinal direction thereof. This embodiment has the similar effects (1) to (5) and (8) to (10) as mentioned above.

Instead of two of the lands 5 in each of the commutator segments 3 that are located respectively at positions nearer to the opposite cutting lines along which the commutator forming plate 1 is cut, one of the lands 5 in each of the commutator segments 3, which extends in an axial direction thereof, may locate at a middle position between the opposite cutting lines along which the commutator forming plate 1 is cut. The number of the lands in each of the commutator segments 3 is not limited to one or two as mentioned above but may be any numbers. This embodiment has the similar effects (1) to (6) and (8) to (10) as mentioned above.

Further, instead of the press forming for the grooves 6a and 6b, any other forming, for example, a roller forming is applicable, if it presses down the upper surface of the lands 5. The grooves 6a and 6b may be formed in a shorter time by the roller forming, too.

Furthermore, instead of two of metal dies 11 and 12 for forming the grooves 6a and 6b extending in different directions separately in their respective directions, a single metal die having a combined hill portions pattern of the metal dies 11 and 12 is applicable for integrally forming the grooves 6a and 6b. This embodiment has the similar effects (1) to (8) as mentioned above.

Figure 15:
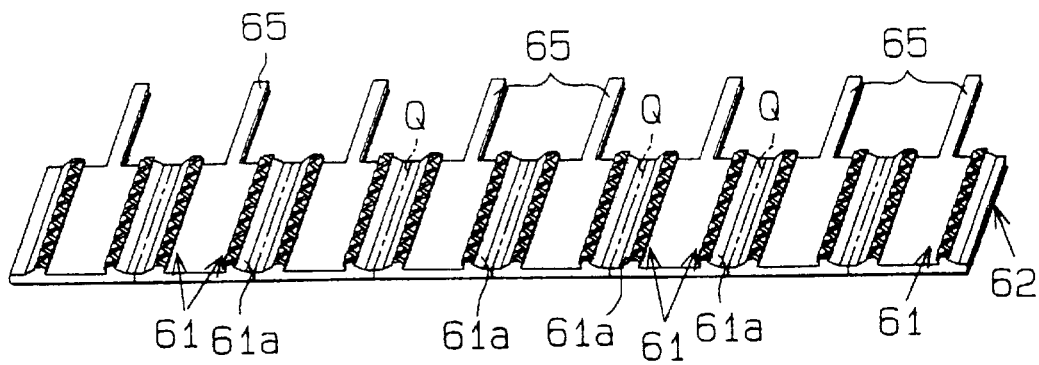
FIG. 15 is a perspective view of a commutator forming plate according to a sixth embodiment of the present invention.
Figure 16A:
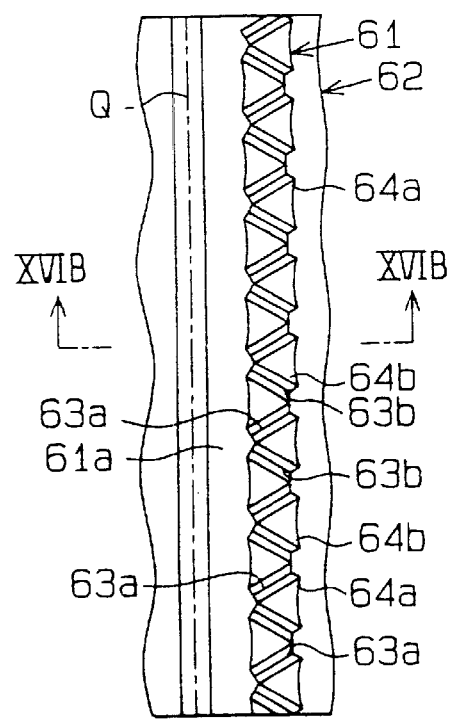
FIG. 16A is a partly enlarged view of the commutator forming plate of FIG.
Figure 16B:
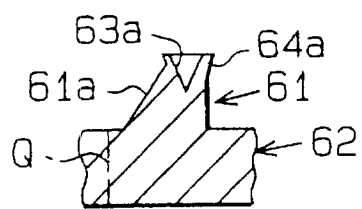
FIG. 16B is a cross sectional view taken along a line XVIB—XVIB of FIG. 16A.

According to a sixth embodiment of the present invention, as shown in FIGS. 15, 16A and 16B, the lands 5 maybe modified to lands 61. Rising portions of the lands 61 located near to and extending along cutting lines Q (shown in dot-slash lines of FIG. 15) along which the commutator forming plate 62 is to be cut are provided with tapered surfaces 61a. An interval between the cutting line Q and the tapered surface 61a in a lateral direction of the land 61 becomes wider toward an upper surface of the land 61. Grooves 63a and 63b similar to the grooves 21a and 21b (refer to FIGS. 10A and 10B) are formed on the upper surfaces of the lands 61. Projecting portions 64a and 64b nearly perpendicular to the rising direction of the land 61 are also formed simultaneously when the grooves 63a and 63b are formed. Further, the commutator forming plate 62 is provided at a lateral end thereof with 8 pieces of projections 65 for risers extending in a lateral direction thereof (between which the respective cutting lines Q are put).

The commutator forming plate 62 mentioned above is rounded into a cylinder so as to locate the projecting portions 64a and 64b inside the cylinder. Then, after pouring fluid resin into the cylinder and hardening the resin, the cylinder is divided into 8 pieces along the cutting lines Q.

Figure 17A:
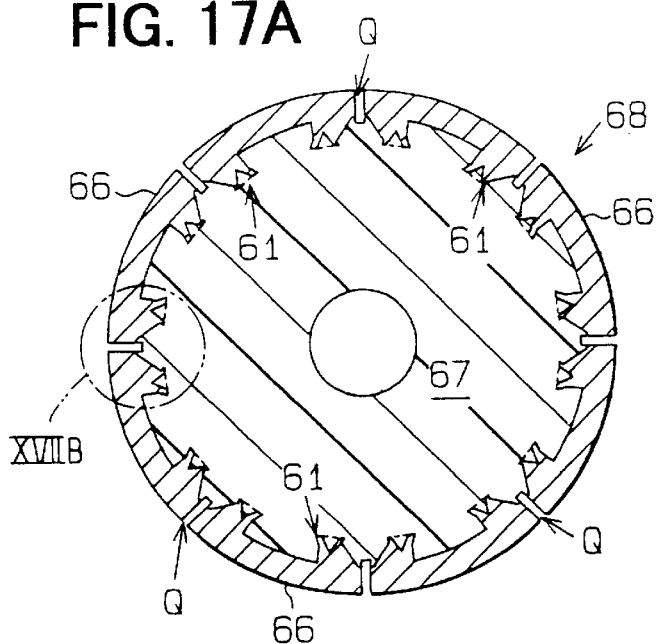
FIG. 17A is a cross sectional view of a commutator according to another embodiment of the present invention.

As a result, as shown in FIG. 17A, a commutator 68 having commutator segments 66 separated from each other and an insulator 67 made of resin hardened is manufactured. As the projecting portions 64a and 64b are radially engaged with resin (the insulator 67), each of the commutator segments 66 is prevented from coming off the insulator 67.

A method of manufacturing the commutator forming plate 62 is described in more detail with reference to FIGS. 17 and 18.

Figure 18:
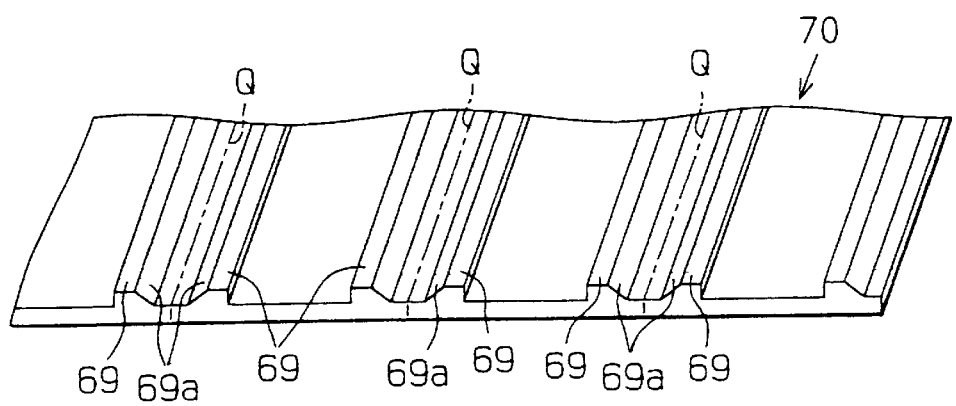
FIG. 18 is a schematic view of a plate for manufacturing the commutator of FIG. 17.

As shown in FIG. 18, an electrically conductive plate 70 having a plurality of lands 69 on one surface thereof is formed by rolling. The lands 69 are arranged at positions (opposite sides of each of the cutting lines Q) corresponding to the positions of the lands 61 of the commutator 68, as shown in FIG. 17A, when the plate 70 is rounded into a cylinder. Each rising portion of the lands 69 near the cutting lines Q is provided with a taper surface 69a in such a manner that an interval between the cutting line Q and the taper surface 69a in a lateral direction of the land 69 becomes wider toward the upper surface of the land 69.

The grooves 63a and 63b and the projecting portions 64a and 64b (refer to FIGS. 16A and 16B) are formed by pressing as mentioned before (in use of the metal dies 11 and 12, refer to FIGS. 6 and 8). Then, the plate 70 is stamped out to constitute projections 65 for risers and to provide the commutator forming plate 62 having predetermind length and width thereof, as shown in FIG. 15. The sixth embodiment has similar effects as the embodiments mentioned before.

Figure 17B:
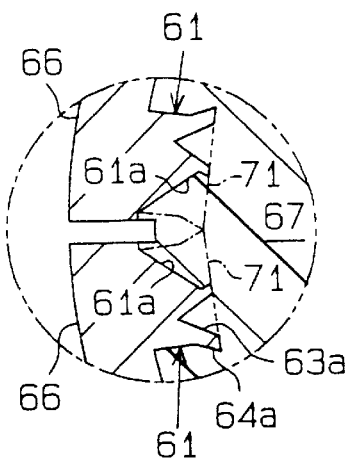
FIG. 17B is an enlarged view of a portion XVIB encircled by a two dots-slash line of FIG. 17A

As shown in an enlarged view of FIG. 17B, in a case of lands 71 having no tapered surfaces 61a, there is a risk that the lands 71 located in adjacent commutator segments so as to directly face to each other in circumferential direction, an interval of which is narrower, come in contact with each other. However, as the lands 61 are provided with the tapered surfaces 61a, the lands 61 to be located in adjacent commutator segments 66 so as to directly face to each other in circumferential direction are unlikely to come in contact with each other, even if the lands 61 have projecting portions 64 a and 64b nearly perpendicular to a rising direction thereof, when the plate 71 is rounded into the cylinder and cut into the commutator segments 66. Accordingly, respective commutator segments 66 can be reliably insulated with each other.

Further, it is very difficult to form the lands having no tapered surfaces and closely adjacent to each other in lateral direction thereof by rolling (it is difficult to provide a roller to be used in rolling working for forming a narrow and perpendicular groove between adjacent lands). However, as the lands 69 have the tapered surfaces 69a, the lands 69 may be easily formed by rolling without enlarging the interval between the adjacent lands. Therefore, the projecting portions 64a and 64b may be formed at opposite ends of each of the commutator segments 66 in circumferential direction thereof so that each of the commutator segments 66 may be rigidly fixed to the insulator 67.

Though each of the lands 61 has the tapered surface 61a according to the above embodiment, the tapered surface 61a may be formed only on one of the lands between which the cutting line Q is put (for example, on the land located on a right side of the cutting line Q in FIG. 15). The lands between which the cutting line is put and which are closely adjacent to each other in a circumferential direction thereof are unlikely to come in contact with each other after the plate is rounded and cut, since the one of the lands has the tapered surface. As a result, respective commutator segments are surely insulated with each other.

What is claimed is:

1. A commutator forming plate to be rounded into a cylinder which is cut at constant angular intervals to form a plurality of commutator segments after being filled with insulating material, comprising:

an electrically conductive plate;

a plurality of lands being arranged at given intervals on one surface of the plate and each rising in a thickness direction thereof so that at least one of the lands may locate in each of the commutator segments, each of the lands being provided on a top thereof with an upper surface having an outer periphery line extending in a longitudinal direction of the land; and a plurality of grooves extending on the upper surface of each of the lands obliquely to the outer periphery line to form a plurality of acute angle edges on the upper surface at positions where the grooves intersect at an acute angle with the outer periphery line, the positions being spaced at given intervals in the longitudinal direction of the land where each of the acute angle edges is provided with a projecting portion protruding outwardly from the land in a lateral direction thereof and nearly perpendicularly to a rising direction thereof.

2. A commutator forming plate according to claim 1, wherein each of the grooves has a letter V shaped cross section.

3. A commutator forming plate according to claim 1, wherein the upper surface has two outer periphery lines facing to each other and each of the grooves extends from one of the two outer periphery lines to the other thereof so as to divide the upper surface.

4. A commutator forming plate according to claim 1, wherein the grooves extend to cross with each other on the upper surface.

5. A commutator forming plate according to claim 1, wherein the lands locate away from respective cutting lines along which the plate is to be cut to form the commutator segments.

6. A commutator forming plate according to claim 5, wherein the lands are arranged on the plate so that two of the lands may locate in each of the commutator segments and an interval of the lands locating in any adjacent two of the commutator segments so as to face each other via the respective cutting lines is smaller than an interval of the lands 5 locating in each of the commutator segments.

7. A commutator forming plate according to claim 6, wherein an interval of the lands locating in any adjacent two of the commutator segments so as to face each other via the respective cutting lines in a rising direction of the lands becomes wider toward the respective upper surfaces.

8. A commutator forming plate according to claim 1, wherein the upper surface has two outer periphery lines facing to each other in a longitudinal direction of the land and each of the grooves intersects obliquely with at least one of the two outer periphery lines.

9. A commutator comprising:

a nearly cylindrical shaped insulator; and a plurality of commutator segments made of conductive material, which are separated from each other and arranged around an outer circumference of the insulator, each of the commutator segments having at least a land embedded in the insulator, the land being provided with an upper surface having an outer periphery line on a top thereof, the periphery line extending in a longitudinal direction of the land, and a plurality of grooves extending on the upper surface of each of the lands obliquely to the outer periphery line to form a plurality of acute angle edges on the upper surface at positions where the grooves intersect at an acute angle with the outer periphery line, the positions being spaced at given intervals in the longitudinal direction of the land where each of the acute angle edges is provided with a projecting portion protruding outwardly from the land in a lateral direction thereof and nearly perpendicularly to a rising direction thereof, each portion engaged with the insulator in a radial direction.

10. A commutator according to claim 9, wherein each of the grooves has a letter V shaped cross section.

11. A commutator according to claim 9, wherein the upper surface has two outer periphery lines facing to each other and each of the grooves extends from one of the two outer periphery lines to the other thereof so as to divide the upper surface.

12. A commutator according to claim 9, wherein the grooves extend to cross with each other on the upper surface.

13. A commutator according to claim 9, wherein the respective lands position away in a circumferential direction from respective cutting lines along which the respective commutator segments are separated and extend in parallel to an axial direction of the insulator.

14. A commutator according to claim 13, wherein each of the commutator segments has two of the lands and an interval of the lands locating in any adjacent two of the commutator segments so as to face each other via the respective cutting lines is smaller than an interval of the lands 5 locating in each of the commutator segments.

15. A commutator according to claim 14, wherein an interval of the lands locating in any adjacent two of the commutator segments so as to face each other via the respective cutting lines in a rising direction of the lands becomes wider toward the respective upper surfaces.

16. A motor comprising:

a stator; and a rotor having the commutator recited in any one of claims 9 to 15.

17. A commutator according to claim 20, wherein each of the grooves has a letter V shaped cross section.

18. A commutator forming plate to be rounded into a cylinder which is cut at constant angular intervals to form a plurality of commutator segments after being filled with insulating material, comprising:

an electrically conductive plate;

a plurality of lands rising at given intervals on one surface of the plate in a thickness direction thereof so that at least one of the lands may locate in each of the commutator segments, each of the lands being provided on a top thereof with an upper surface having two outer periphery lines facing each other;

a plurality of grooves extending on the upper surface so as to intersect obliquely with one of the two outer periphery lines so that a plurality of acute angle edges on the upper surface are formed by the grooves, the grooves extending from the one of the two outer periphery lines to the other there of so as to divide the upper surface; and a plurality of projecting portions protruding from the land nearly perpendicularly to a rising direction of the land in a vicinity of the acute angle edges.

19. A commutator forming plate according to claim 18, wherein each of the grooves has a letter V shaped cross section.

20. A commutator comprising:

a nearly cylindrical shaped insulator; and a plurality of commutator segments made of conductive material, which are separated from each other and arranged around an outer circumference of the insulator, each of the commutator segments having at least a land embedded in the insulator, the land being provided with an upper surface having two outer periphery lines facing to each other on a top thereof, a plurality of grooves extending on the upper surface so as to intersect obliquely with a one of the two outer periphery lines so that a plurality of acute angle edges on the upper surface are formed by the grooves, the grooves extending from one of the two outer periphery lines to the other thereof so as to divide the upper surface; and a plurality of projecting portions protruding from the land nearly perpendicularly to a rising direction of the land in a vicinity of the acute angle edges and are engaged with the insulator in a radial direction.

21. A commutator according to claim 9, wherein the upper surface has two outer periphery lines facing to each other in a longitudinal direction of the land and each of the grooves intersects obliquely with at least one of the two outer periphery lines.

* * * * *